United States Patent [19]

Daigle

[11] Patent Number: 5,123,415
[45] Date of Patent: Jun. 23, 1992

[54] ULTRASONIC IMAGING BY RADIAL SCAN OF TRAPEZOIDAL SECTOR

[75] Inventor: Ronald E. Daigle, Redmond, Wash.

[73] Assignee: Advanced Technology Laboratories, Inc., Bothell, Wash.

[21] Appl. No.: 556,691

[22] Filed: Jul. 19, 1990

[51] Int. Cl.⁵ .............................................. A61B 8/02
[52] U.S. Cl. .................................. 128/661.01; 73/625
[58] Field of Search ...................... 128/661.01, 661.08, 128/660.08; 73/625, 626

[56] References Cited

U.S. PATENT DOCUMENTS

| | | | |
|---|---|---|---|
| 4,159,462 | 6/1979 | Rocha et al. | 128/661.01 |
| 4,180,790 | 12/1979 | Thomas | 73/626 |
| 4,235,111 | 11/1980 | Hassler | 73/626 |
| 4,241,610 | 12/1980 | Anderson | 73/626 |
| 4,290,310 | 9/1981 | Anderson | 73/626 |
| 4,310,907 | 1/1982 | Tachita et al. | 128/660.01 |
| 4,368,643 | 1/1983 | Tachita et al. | 128/661.01 |
| 4,561,308 | 12/1985 | Bele et al. | 73/626 |
| 4,611,494 | 9/1986 | Uchiyama | 73/626 |
| 4,644,795 | 2/1987 | Augustine | 128/661.01 |
| 4,649,927 | 3/1987 | Fehr et al. | 128/661.01 |
| 4,691,570 | 9/1987 | Hassler | 128/661.01 |
| 4,722,345 | 2/1988 | Ueno et al. | 128/660.09 |
| 4,893,283 | 1/1990 | Pesque | 128/661.01 |
| 4,937,797 | 6/1990 | Snyder et al. | 128/661.08 |
| 5,005,419 | 4/1991 | O'Donnell et al. | 128/661.01 |

Primary Examiner—Francis Jaworski
Assistant Examiner—George Manuel
Attorney, Agent, or Firm—W. Brinton Yorks, Jr.

[57] ABSTRACT

An ultrasonic diagnostic imaging system is provided for scanning with a linear transducer array and displaying an image area which is truncated with respect to a conventional triangular image sector to take the form of a trapezoid. Uniformity of image resolution and ease of signal processing enhancement is provided by transmitting adjacent ultrasonic beams at equal angular increments over the sector area. The ultrasonic beams transmitted are focused around predetermined transmit focal points and the transmit aperture employed for each transmission is determined by a transducer sensitivity criterion applied to the focal point. Means are provided for delaying signal components received from the beam directions so that the sum of the components will form a coherent echo signal. Means are provided for dynamically focusing received signal components by dynamically focusing received signal components by dynamically varying the sampling frequencies of laterally disposed signal components, and the receive aperture is dynamically varied in correspondence with the number of array elements which satisfy a sensitivity criterion at different depths of field.

7 Claims, 5 Drawing Sheets

ULTRASONIC IMAGING BY RADIAL SCAN OF TRAPEZOIDAL SECTOR

This invention relates to ultrasonic imaging using a linear transducer array and, in particular, to imaging through use of such a transducer array over an imaging field comprising a trapezoidal sector.

Ultrasonic imaging systems which perform sector scanning utilizing a linear array are known in the art to comprise a linear array of transducers which are successively activated at times delayed with respect to individual transducers so as to transmit a radial scan beam in a predetermined direction. The relative delay times of transducer activation is successively varied so that the radial beam is angularly steered across the sector scan field. Conventionally this sector scan field has an origin point located on the surface of the transducer array such that the near field is represented in a substantially triangular, pointed format. Accordingly, near field breadth of view is limited by this point source origin of the sector scan field at the surface of the transducer.

The prior art contains numerous approaches directed toward improving the breadth of the scan in the near field. A simple approach is to perform the scanning through a water-filled bag as a stand off from the skin surface. The effect of this approach is to offset the origin of the field from the surface of the skin, thereby effectively truncating the triangular sector and creating a broader field of view at the skin surface. However, image resolution at increasing depths is compromised, as these depths are relatively more greatly removed from the scanning transducer by the thickness of the water-filled bag.

A second approach is to perform conventional linear array scanning over the center of the sector by transmission of a plurality of beams normal to the surface of the array, and to scan a portion of a fan-like sector field at each end of the array. This technique also increases near field resolution without causing the deterioration in depth of field resolution which is characteristic of the prior approach.

A third approach is to activate the transducers of a successively selected, laterally shifting group of transducers of a linear array such that the transmitted beams form a sector scan field of which the origin point is located behind the transducer array. This technique is described in U.S. Pat. No. 4,368,643 and offers an improvement in simplification of the scan converter necessary to process the returned echo signals for a visual display. The display format is simplified by incrementing the angle of the radial scan beams in substantially equal tangential increments. Furthermore, the returning echo data is sampled at a rate which varies inversely with the cosine of the angle of the radial scan beams. Thus, the desired simplification of the scan converter is offset by increased complexity in the trigonometric variability of the scanning rate. Additionally, lateral resolution is decreased as the spacing between the radial scan beams increases in the lateral direction relative to the center of the scanning field.

In accordance with the principals of the present invention, a linear transducer array scanning technique is described in which transmit beams form a trapezoidal-shaped sector scan field. In order to provide substantially uniform resolution throughout all areas of the trapezoidal sector field and to more readily provide image processing enhancements, the angles of successive radial scanning beams are incremented in substantially equal angular increments relative to the linear array across the sector scan field. Transmit focusing is employed, with the transmit aperture determined by those array elements satisfying a predetermined sensitivity criterion. Returning echo signals are processed by transmission through delay means which provides several image enhancements. The delay means imparts relative delays to signal components received by individual transducers in the array so as to bring the returning echo signal components into a common alignment in time for each scanning angle. The delay means inhibits the reception of signal components from laterally disposed transducer elements in the array until the reception of echo signals from increasing depths so as to expand the aperture of the array in concert with the reception of echo signals from increasing depths. Dynamic focusing is provided by varying the frequency at which laterally disposed echo signals are sampled over the depth of field. By transmitting the beams and processing the returning echo signals in this way, near field breadth of view is improved as well as image resolution at increasing depths of focus.

Figure 1:
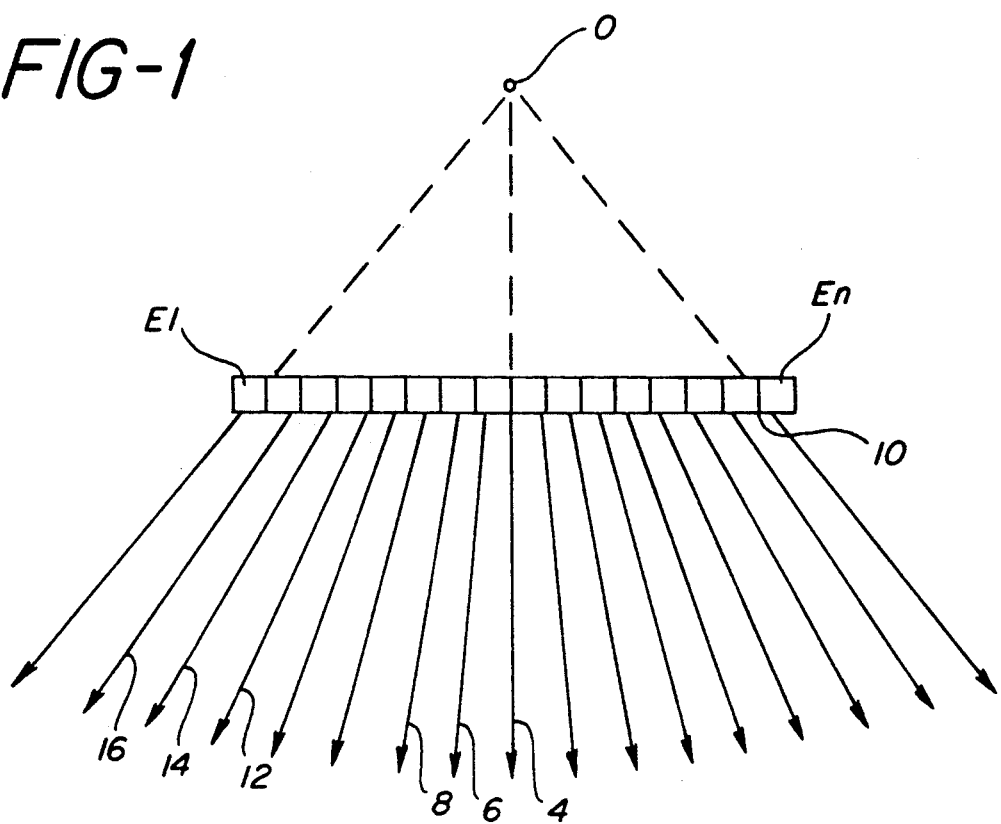
FIG. 1 illustrates the ultrasonic beam pattern of a trapezoidal sector which is scanned in accordance with the present invention.

Referring first to FIG. 1, a linear array 10 of individual transducer elements is shown. Through the timed actuation of all elements or subgroups of the elements of the array 10, ultrasonic beams are transmitted from the array at angles increasing from the normal direction for ultrasonic beams emanating at increasing distances from the center of the array. A number of these beams are indicated at 4, 6, 8, 12, 14, and 16. All of the beams transmitted by the array 10 would appear to emanate from an origin O located behind the transmitting surface of the array. The area scanned in this manner thus represents a truncation of the conventional triangular sector area, with improved breadth of view in the near field as compared to a phased array, and improved breadth of view in the far field as compared to a linear array. The scanned area is seen to be in the form of a trapezoid, with the smaller parallel side of the trapezoid adjacent to the linear array 10 and the angular sides of the trapezoid at the lateral extremities of the array.

In order to provide an ultrasonic image with uniform resolution, successively disposed ultrasonic beams are transmitted at angles which are incremented by uniform angular increments, proceeding from the center of the array 10. For instance, when ultrasonic beam 4 in FIG. 1 is the central beam in the scan field it is transmitted at an angle of 90 degrees with respect to the surface of the array 10. The adjacent beam 6 in this example is transmitted at an angle equal to 90 degrees +dt, where dt is a given angular increment delta theta. The next beam 8 in the scan field is transmitted at an angle of 90 degrees +2 dt. Beam 14 is transmitted at an angle which is offset from the angles of beams 12 and 16 by the same angular increment, dt.

The transmission of ultrasonic beams and subsequent echo signal reception at these equal angular increments afford a further ease in the implementation of signal processing image enhancements. This displacement of signals in this fashion results in a uniform distribution of echo information in r-$\theta$ space throughout the image. Even though the coordinate system of the image may subsequently be converted from r-$\theta$ coordinates to the X-Y coordinates of a scan converter, the r-$\theta$ uniformity of image information affords uniform results when the information is subjected to processing enhancements such as interpolation and spatial filter sampling. Enhancement effects will be uniformly distributed throughout the image, independent of depth of field variation in results.

Figure 2:
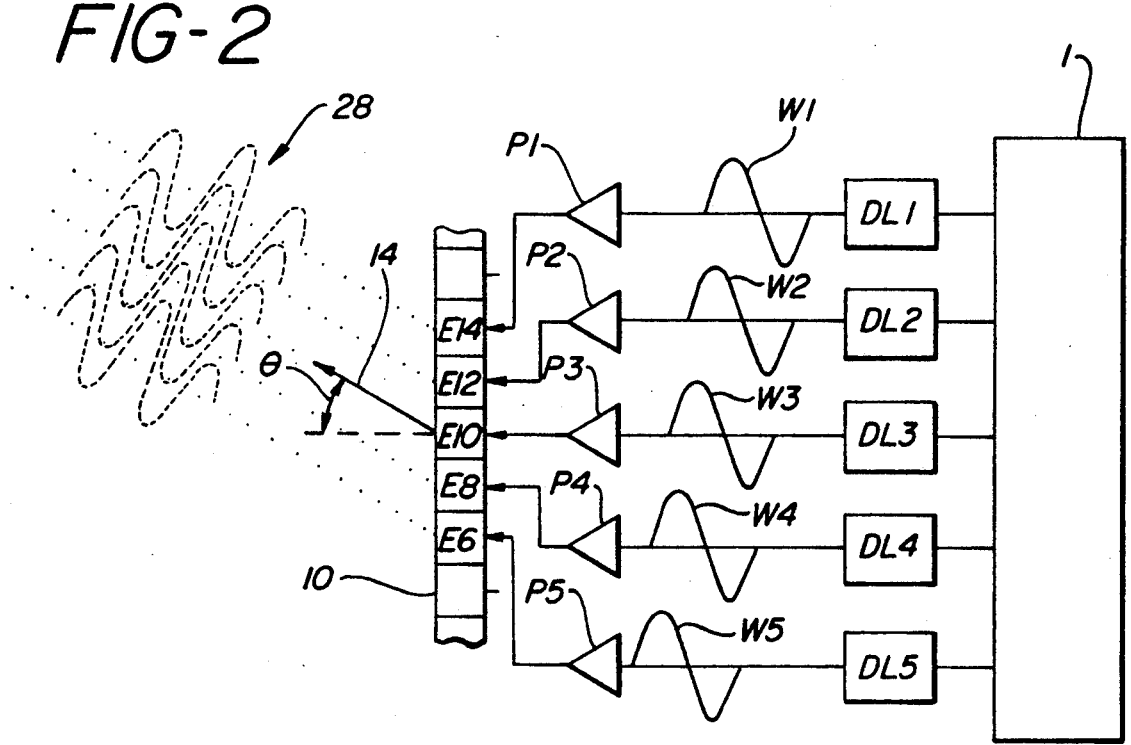
FIG. 2 illustrates the steering of a transmitted ultrasonic beam in accordance with the principles of the present invention.

FIG. 2 illustrates in block diagram form apparatus for transmitting one of the angular beams 14 of FIG. 1. As indicated by the beam direction arrow 14, the wavefront of this beam is transmitted at an angle $\theta$ with respect to an axis which is normal to surface of the transducer array 10. Illustrative components of the transmitted wavefront which are launched by individual transducer elements E6, E8, E10, etc., are indicated at 28. In order to transmit the wavefront 28 in this direction, it is necessary to incrementally stagger the times at which respective individual transducers of the array are actuated. This causes the wavefront to be launched at an angle to the transducer array which is a function of the amount of delay time between transmit actuations of adjacent elements. In the embodiment of FIG. 2 a controller 1 transmits pulsar actuation signals through delay lines DL1 through DL5. For transmission in the direction of arrow 14, the lengths of the respective delay lines progressively increase from DL5 through DL1. These times are indicated by the respective positions of pulsar actuation signals w5 through w1. Pulsar actuation signal w5 will actuate pulsar P5, which in turn will excite transducer element E6. Thereafter pulsar actuation signals w4 through w1 will successively actuate pulsars P4 through P1, thereby exciting transducers E8 through E14. Through selective staggering of the delays of the delay lines, an off axis wavefront as indicated at 28 will emanate as a combined result of the actuation of the individual transducer elements E6 through E14.

Figure 3A:
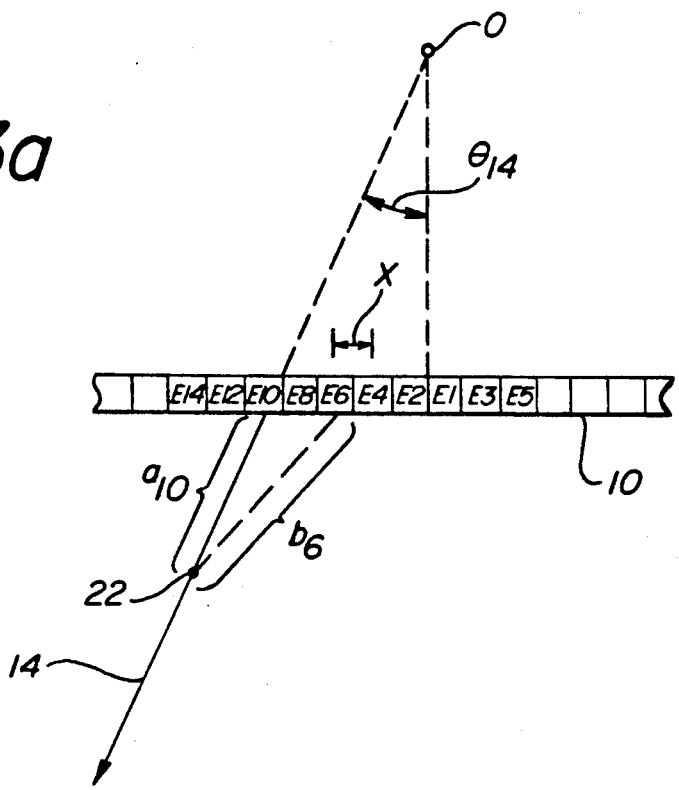
FIG. 3a and 3b illustrate transmit focusing of steered ultrasonic beams in accordance with the principles of the present invention.

In addition to steering the beam in the proper direction as shown in FIG. 2, it is also desirable to focus the beam at a selected depth along the beam path for higher resolution imaging at a particular depth of interest. FIG. 3a illustrates a technique for focusing the beam transmitted in direction 14 at focal point 22. By assuming a certain speed of sound through the acoustic medium being interrogated, and by knowing the angle $\theta_{14}$, the distance from the origin O to the focal point 22, and the interelement spacing X, the distances from the respective transducer elements to the focal point 22 are determined. Two of these distances $a_{10}$ and $b_6$ are indicated in FIG. 3 for elements E10 and E6. By knowing the distances from the transducer elements to the focal point, and the speed of sound in the acoustic medium, the transit time of ultrasound from the respective transducer elements to the focal point 22 is determined. The interelement transit time differences are taken into account by the selection of the lengths of the delay lines DL1-DL5 in the excitation of the transducer elements to cause the steered beam to be focused in the vicinity of focal point 22. If desired, the image sector may be repetitively scanned with different focal points along the ultrasonic beam path 14 in order to assemble an image which is focused at numerous depths of field.

FIG. 3a illustrates the ultrasonic beam 14 as emanating from transducer array element E10, which is at the center of the aperture of beam 14. From the discussion of FIG. 2 it may be appreciated that transducer element E6, when included in the aperture of beam 14, is actuated at a time preceding the actuation of element E10 by reason of the increased transit time of path $b_6$ as compared with that of the shorter path $a_{10}$. However, the time marker for the transmission of ultrasonic beam 14 is taken as the time of actuation of the effective central element, element E10 in FIG. 3a, even though the central element is not the first to be actuated in the launching of the beam wavefront.

Figure 3B:
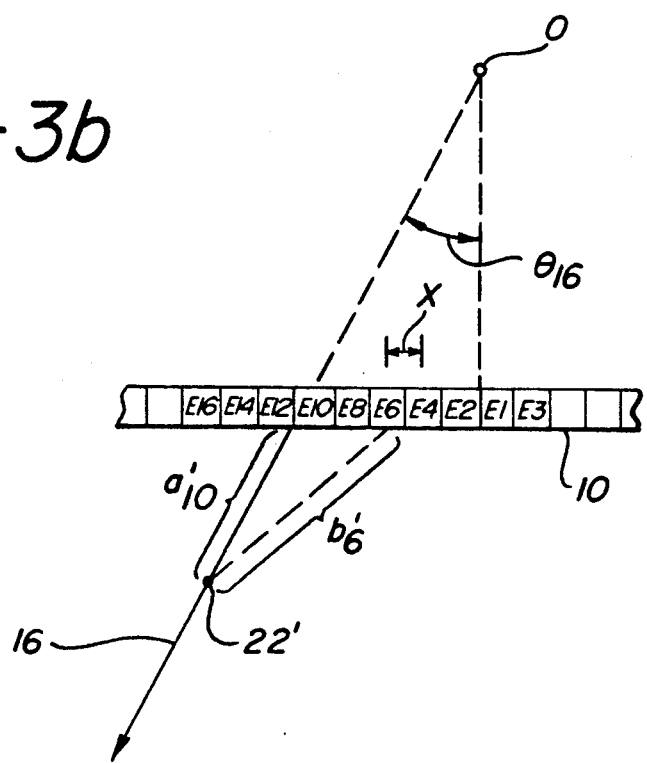

In a similar manner the transmission and focusing of next adjacent ultrasonic beam 16 of the scan area is depicted in FIG. 3b. Beam 16 is transmitted at an angle $\theta_{16}$, which is equal to $\theta_{14}+dt$. When beam 16 is to be focused about point 22', the distance from the effective origin O to focal point 22', the interelement spacing X, and the angle $\theta_{16}$ are used to determine the distances $a'_{10}$ and $b'_6$ from the active transducer elements to the focal point 22', and the ultrasonic speed of the medium is used to determine corresponding transmit times. In this manner a data table of transit times and transit focal depths is assembled for the transducer groups used to transmit all of the ultrasonic beams of the scan field.

It will also be noted that the effective central element of the beam 16 is between elements E10 and E12 in FIG. 3b. For this example the time marker for the launching of ultrasonic beam 16 is neither the time of actuation of element E10 nor E12, but is a calculated time between two actuation times.

To minimize the amount of noise in the sector image, side lobe effects are reduced by progressively widening the aperture of the transducer at increasing depths of field. Thus, in the near field, only a few elements may be used to generate the steered and focused wave front, while in the far field a greater number of transducer elements are employed. The criterion for determining the number of elements employed in the aperture at any depth of field is the sensitivity pattern of the respective transducers. Each individual transducer element in the array has its own antenna pattern, often referred to as the element sensitivity pattern, which is not omni directional and generally favors signals coming from a direction normal to the transducer. Three exemplary sensitivity patterns, A8, A14, and A20, are shown for respective transducer elements E8, E14 and E20 in FIG. 4. The boundary of each sensitivity pattern indicates a constant level of reduced sensitivity taken with respect to peak sensitivity for each of the corresponding transducer elements. In this example it is seen that point 23 on ultrasonic beam 14 is within the limits of the sensitivity patterns A8 and A14 for respective elements E8 and E14. The point 23 is not within the sensitivity pattern of element E20, and hence elements E8 and E14 but not element E20 would be employed in focusing beam 14 at focal point 23. The point 25, however, is within the uniform sensitivity boundaries of all three sensitivity patterns A8, A14, and A20. Hence, when beam 14 is focused at point 25 all of the elements E8, E14, and E20, as well as intervening transducer elements, would be included in the beam aperture.

Another technique for making the same determination of elements to include in the aperture for focusing at point 23 is to determine the sensitivity of individual transducer elements in the array to signals emanating from point 23 through a predetermined acoustic medium. Those falling within a range of sensitivity levels below a given threshold, such as 6 dB below the signal strength of the transducer nearest the focal point, would be used in the aperture for point 23. At increasing depths of field the relative differences in sensitivity between adjacent transducer would decrease, and hence an increasing number of transducers would be used in the aperture for increased depths of focus.

Figure 5:
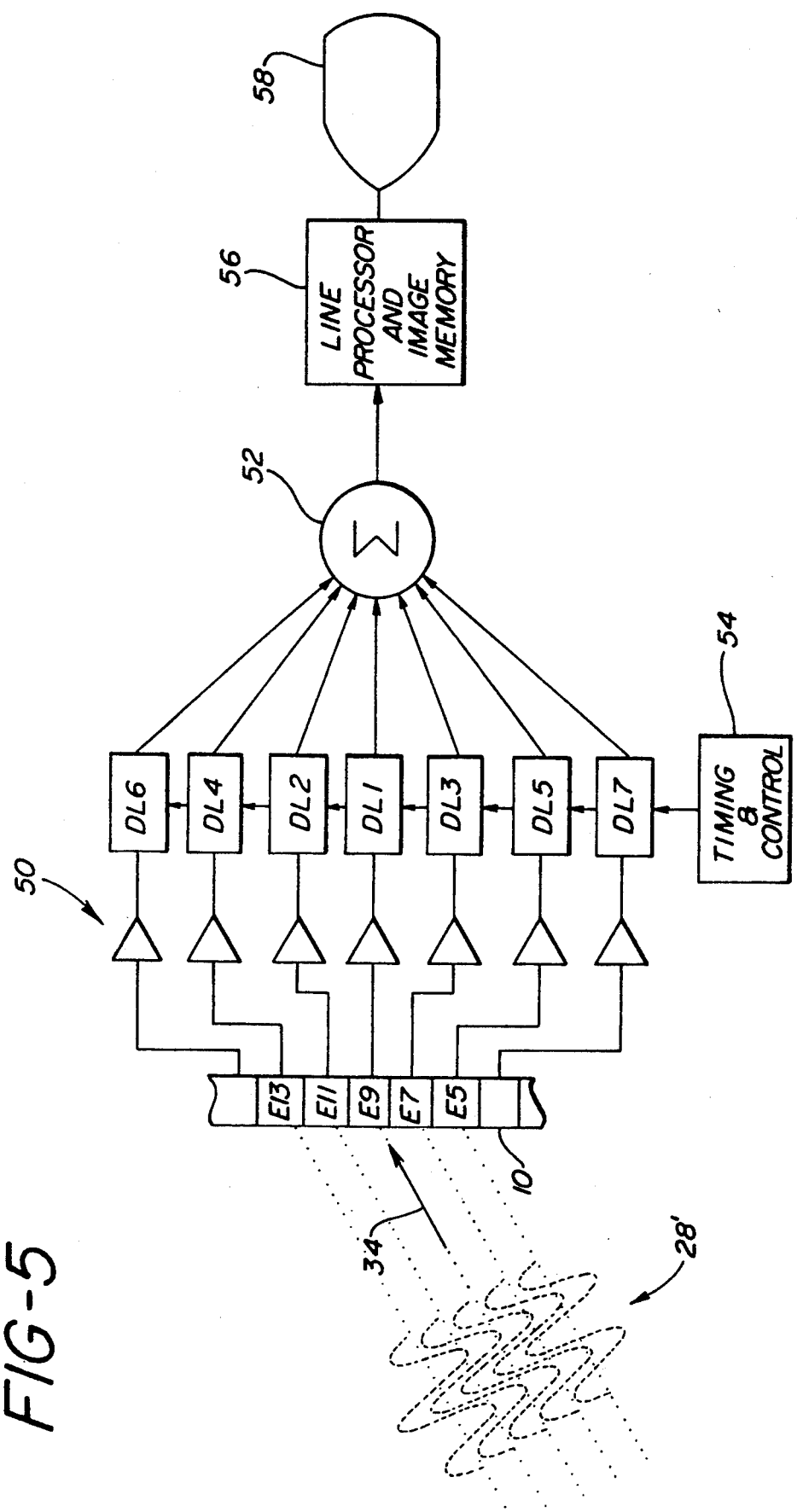
FIG. 5 illustrates the focusing and summation of received echo signal components in accordance with the principles of the present invention.

Upon reception of echoes resulting from transmissions in the beam directions shown in FIG. 1, a reversal of some of the transmit conditions and responses occurs. FIG. 5 illustrates a returning echo wavefront 28', which is returning to the transducer array 10 in a direction indicated by arrow 34. As FIG. 5 indicates, this wavefront will reach transducer element E5 first, then successively arrive at and be detected by elements E7 through E13. The received echo signal components are amplified by amplifiers indicated at 50, and delayed by respective delay lines indicated as DL1 through DL7. The lengths of the respective delay lines are controlled by timing and control subsystem 54. In this example delay line DL5 would be the longest delay line employed to bring the echo signal components of angular beam 34 into time coincidence, with delay lines DL3, DL1, DL2, and DL4 being progressively shorter in length to focus the components of echo 28' received by elements E5 through E13. When the delay line lengths are properly staggered, signal components will be produced at the output of the delay lines in time synchronism and be summed constructively by summer 52. The echoes returning from increasing depths of field along beam direction 34 are processed and stored by line processor and image memory 56 and subsequently displayed on an image display 58.

As in the transmit case, returning echo signals are focused and the array aperture during echo reception is varied according to the depth of returning signals. Unlike the transit mode, however, receive focusing and aperture is varied dynamically as echoes are received from the near to the far field.

Figure 6:
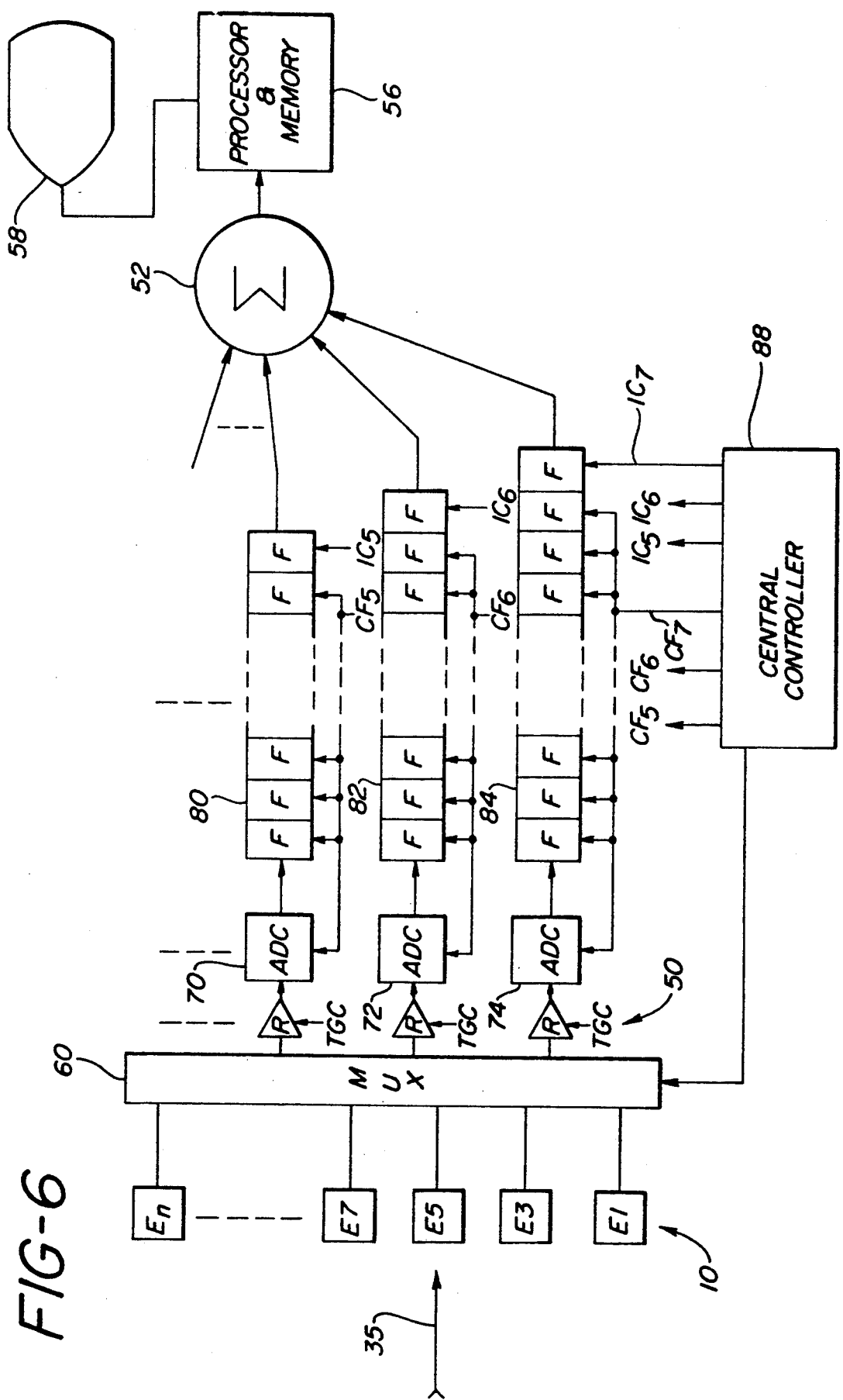
FIG. 6 is a block diagram of an image beamformer which dynamically varies the aperture and focusing of received echo signals.

FIG. 6 illustrates in block diagram form an implementation of the receiving arrangement of FIG. 5 which focuses received echo signal components over the full depth of field while varying the aperture of the transducer array. The individual elements E1 through En of the transducer array are connected to delay lines of appropriate length by way of individual receiver amplifiers 50 of the respective delay lines. The gain characteristics of the receiver amplifiers 50 may be shaped by selected time gain control signals as indicated at the TGC inputs of the receiver amplifiers. FIG. 6 illustrates three of the delay line paths of the receiver arrangement; however, it is understood that there are as many delay line paths as there are elements in the transducer array 10.

The echo signal components received by the receiver amplifiers 50 are digitized by respective analog to digital converters 70, 72, and 74 and the digitized signal samples are shifted into the input stages of ripple through rigister delay lines 80, 82, and 84 of lengths appropriate to the delays to be imparted to the respective echo components. The length of each delay line register must be at least of sufficient length to provide the maximum period of delay required by its associated transducer element during any scanning procedure. The delay line lengths are a function of the transit time differences of echo signal components from the various points of the scanned area to the respective transducer elements. The delay period of a particular delay line 80, 82 and 84 is determined by the starting times of echo signal sampling and the frequency at which the digitized samples are clocked into and out of the delay line, in consideration of the maximum angle $\theta_{max}$ at which beams are steered and the maximum aperture. The delay period required by each transducer elements can be analyzed in terms of the delay required for focusing and the delay required for steering. In general, the central element of the array will require the largest focusing delay, with laterally disposed elements requiring lesser delays as a function of their distance from the central element. For steering delays, the most laterally disposed element in the direction of steering requires the greatest delay and the most laterally disposed elements in the direction opposite the steering direction requires the shortest steering delay. Since the steering delays will generally predominate in magnitude, as a general principle the required delays are greatest for lateral elements and least for the central element. This is the principle embodied in FIG. 6, in which the register of delay line 80 for element E9 is shorter in length than those of delay lines 82 and 84 which are associated with more laterally disposed elements E8 and E7. For a broad field of view maximum delays of up to 80 to 100 microseconds are desirable.

The respective analog to digital converters and the input stages to delay lines 80, 82, and 84 are clocked by clock signals $CF_7$, $CF_8$, and $CF_9$ developed by the central controller 88. In order to focus the received echoes over the full depth of field, it is necessary to dynamically change the relationship at which samples are taken in time among the respective elements of the aperture. Consider in FIG. 6 the condition where aperture elements E1–En are to be focused at the head of the beam arrow 35. In this case the distance (and hence the transit time of sound) from the focal point to the central element E8 is much less than the distance from the focal point to either of the laterally disposed elements E1 or En. But as the array is focused at increasing depths of field this relative disparity in distances declines. For instance, the disparity in distances from the tail of beam arrow 35 to elements E1, E8, and En is substantially less on a percentage basis. At an infinite focal point, of course, all the ultrasonic path lengths would be the same in this example. To account for these varying disparities, and hence to continually focus the transducer array during echo reception, the sampling frequencies of selected analog to digital converters are continually varied. Since the distances to the laterally remote elements of the aperture are much greater than the distance to the central element of the aperture at near focal points but approach the distance to the central element as the range increases, it is necessary to sample the enchoes in correspondence with this decline in distance disparity. This is accomplished by sampling at higher frequencies at the laterally remote elements, and decreasing the sampling frequencies as the focal depth increases. The frequencies of clock signals $CF_7$, $CF_8$, and $CF_9$ decline from respective higher frequencies for near field focus, and approach on a continually varying basis some predetermined lower frequency as the depth of focus increases. Preferably the differently varying clock frequencies approach a nominal rate in the far field which is in the range of 10–30 MHz. The clock signals associated with laterally disposed transducer elements of the aperture which are at greater spatial distance to the initial focal point will have initial CF clock frequencies which are higher than those associated with transducer elements which are closer to the focal point.

As echo signal samples are clocked into the delay lines 80, 82, and 84 the samples rapidly propagate through the intermediate central registers and accumulate in their sampling sequence at the end of the registers. The signal samples are then clocked out of the delay lines in time synchronism by output clock signals, $OC_5$, $OC_6$, and $OC_7$. The output stages of the delay lines will thus normally be clocked in synchronism by the output clock signals, and the sequence of signal samples in the central registwer will continually propagate to the output stages as signal samples are clocked out of the delay lines. The concurrently clocked output signal components of the delay lines 80, 82, and 84 are coherently summed by adders in a summing network 52, and the summed signals are then transmitted to the line processor and image memory 56 for display on the display 58.

Figure 4:
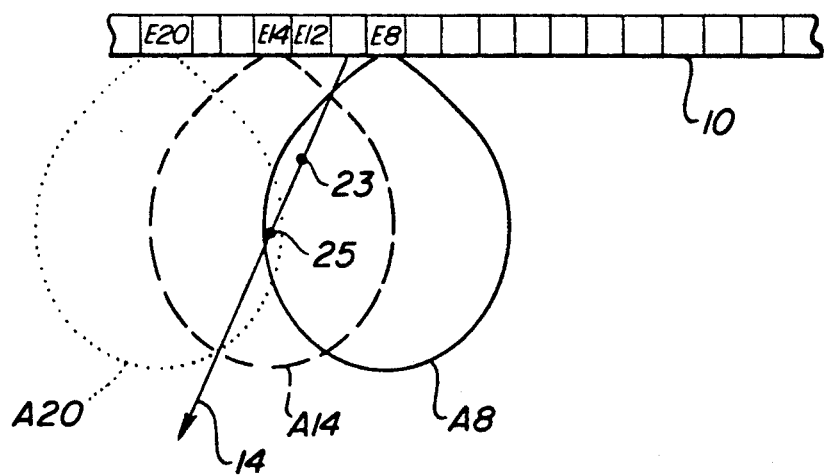
FIG. 4 illustrates the criterion for varying the aperture of a transducer array in accordance with the present invention.

The output clock signals, in addition to synchronously clocking the delayed echo signal components out of the output stages of the delay lines 80, 82, and 84, also control dynamic variation of the receive aperture. The number of transducer elements used in the receive aperture varies from a small number initially to a larger number in the far field, in accordance with the number of transducers satisfying a sensitivity criterion at different focal points as illustrated in FIG. 4. Thus, the times at which laterally remote elements from the beam center begin to contribute to the active aperture is delayed until a sensitivity-determined depth of focus is reached at which time they are to be added the aperture. The central controller 88 retards the times at which the input and output stages of the delay lines of laterally remote transducer elements of the aperature begin sampling and thus produces delayed output signals for summation with the other signal components of the aperture. In a constructed embodiment a maximum delay of up to 340 microseconds can be provided before a respective transducer element participates in signal summation. Thus, as the depth of field increases, the receive aperture is broadened as signal components from laterally more remote elements are added to the coherent signal. This maintains substantially constant lateral resolution throughout the imaging field.

What is claimed is:

1. An ultrasonic diagnostic imaging system for scanning and displaying an image sector in the form of an image area of matter by means of a linear array of transducer elements adjacently arranged in a line, comprising means for sequentially actuating groups of said transducer elements so as to sequentially transmit a plurality of ultrasonic beams over said image area of matter at a plurality of different angles with respect to said line, said differently angled beams having different effective origins along said line, and spatially adjacent ones of said ultrasonic beams being angularly differentiated from each other by equal angular increments.

2. The ultrasonic diagnostic imaging system of claim 1, wherein said ultrasonic beams are transmitted at respective angles $\theta_1$ where n indicates the position of an ultrasonic beam along the transducer array and the transmitted angle of each ultrasonic beam $\theta_n$ differs from the adjacent beams $\theta_{n+1}$ and $\theta_{n-1}$ by an angular increment delta theta.

3. The ultrasonic diagnostic imaging system of claim 2, wherein a centrally located axis to the transducer array is positioned at an angle of ninety degrees with respect to said linear transducer array, the ultrasonic beam on one side of said centrally located axis is transmitted at an angle of ninety degrees plus delta theta, and the ultrasonic beam on the other side of said centrally located axis is transmitted at an angle of ninety degrees minus delta theta.

4. The ultrasonic diagnostic imaging system of claim 1, wherein said actuating means includes means for actuating a predetermined number of transducer elements, said predetermined number of transducer elements comprising the transmit aperture for transmitting a focused ultrasonic beam, said predetermined number being relatively lesser when the focal point of said transmitted beam is relatively close to said transducer elements, and relatively greater when the focal point of said transmitted beam is relatively far from said transducer elements.

5. The ultrasonic diagnostic imaging system of claim 4, further comprising means for receiving and focusing echo signal components from said beam direction angles, including means for dynamically varying receive focusing from the near field through the far field.

6. The ultrasonic diagnostic imaging system of claim 5, further comprising means for varying the number of transducer elements from which echo signal component are processed during reception of echo signal components from a given beam direction, said number of transducer elements from which echo signal components are processed comprising the receive aperture, said receive aperture comprising relatively few transducer elements during reception of echo signal components from said near field and a relatively greater number of transducer elements during reception of echo signal components from said far field.

7. The ultrasonic diagnostic imaging system of claim 6, wherein said receive aperture is varied in correspondence with the number of transducer elements which satisfy a given sensitivity criterion at a given point along said beam direction.

* * * * *